United States Patent [19]

Gunter

[11] 4,125,387
[45] Nov. 14, 1978

[54] HEAT PIPES FOR FIN COOLERS

[75] Inventor: Charles E. Gunter, Vienna, W. Va.

[73] Assignee: PPG Industries, Inc., Pittsburgh, Pa.

[21] Appl. No.: 507,314

[22] Filed: Sep. 19, 1974

[51] Int. Cl.[2] .......................................... C03B 37/02
[52] U.S. Cl. .......................................... 65/2; 65/12;
65/356; 165/105
[58] Field of Search ............... 65/2, 12, 356; 165/105

[56] References Cited

U.S. PATENT DOCUMENTS

| 3,644,110 | 2/1972 | Sendt | 65/356 X |
| 3,708,271 | 1/1973 | Loewenstein et al. | 65/12 |

OTHER PUBLICATIONS

Machine Design, "Cooling with Heat Pipes," by F. J. Lavoie, Aug. 6, 1970, pp. 86-91.

Primary Examiner—Arthur D. Kellogg
Attorney, Agent, or Firm—John E. Curley

[57] ABSTRACT

A method and apparatus is described for cooling molten cones of glass drawn from a fiber glass manufacturing bushing for the purpose of removing heat from the cones of glass during formation. The heat removal means utilized involves flat, platelike fins or bars of metal connected to a common header through which heat transfer fluid is circulating. The platelike member has incorporated therein wick material on the interior, peripheral surfaces thereof. The wick contains a liquid therein which is vaporized rapidly during heat removal and condensed within the interior of the platelike members and redeposited on the wick for continuous circulation of fluid in the fin during operation. The wick material and the fluid associated therewith contained in the platelike member is sealed in the platelike member to prevent dissipation therefrom. Embodiments showing the utilization of configurations of fins other than the platelike member are described and a method of providing for a vertical temperature gradient below the bushing tips over a given distance are also described.

3 Claims, 9 Drawing Figures

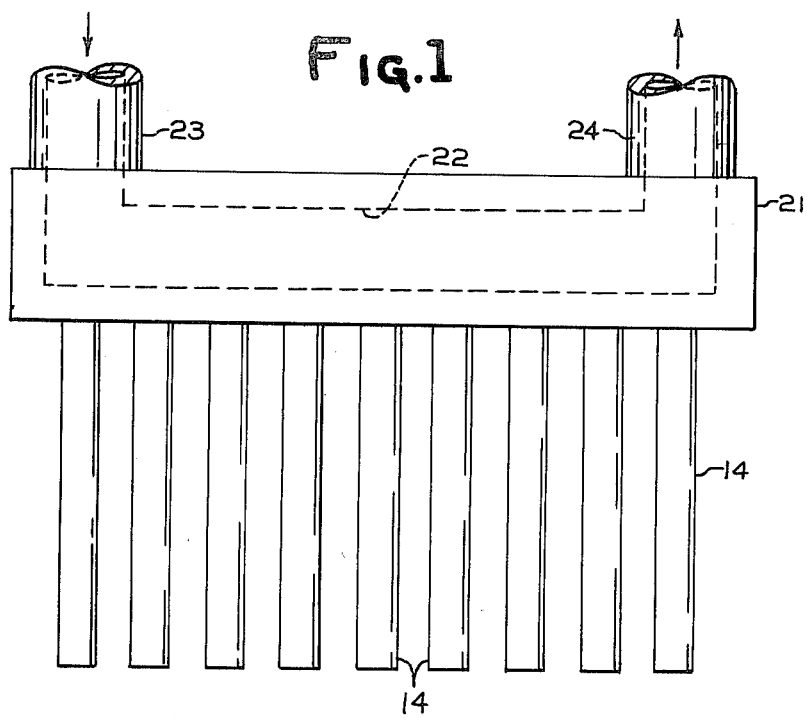
Fig. 1
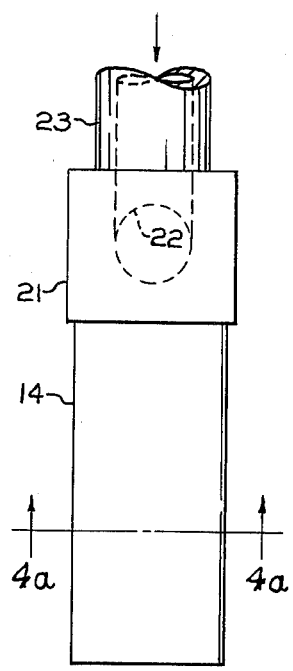
Fig. 2
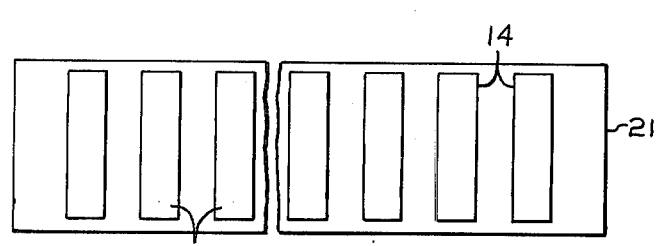
Fig. 3
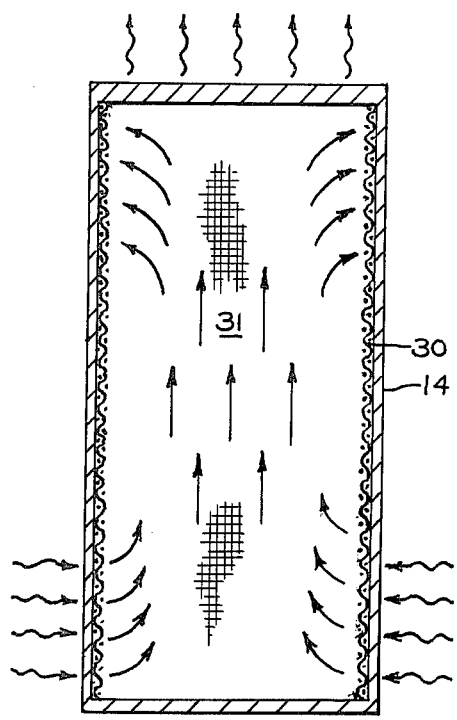
Fig. 4
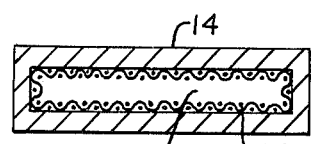
Fig. 4a
Fig. 5
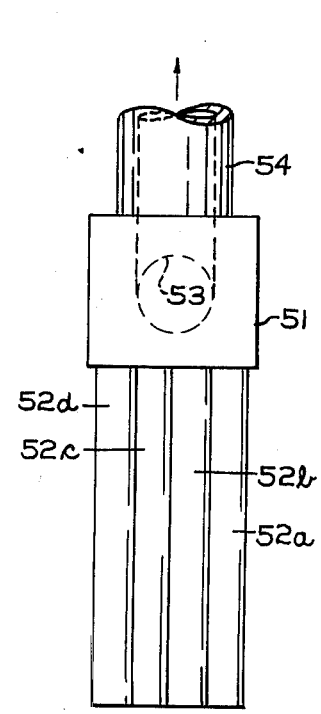
Fig. 6
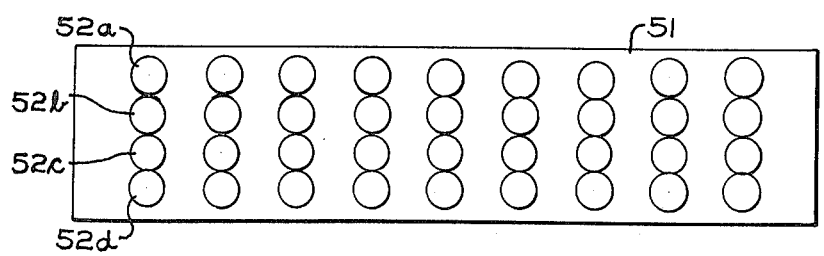

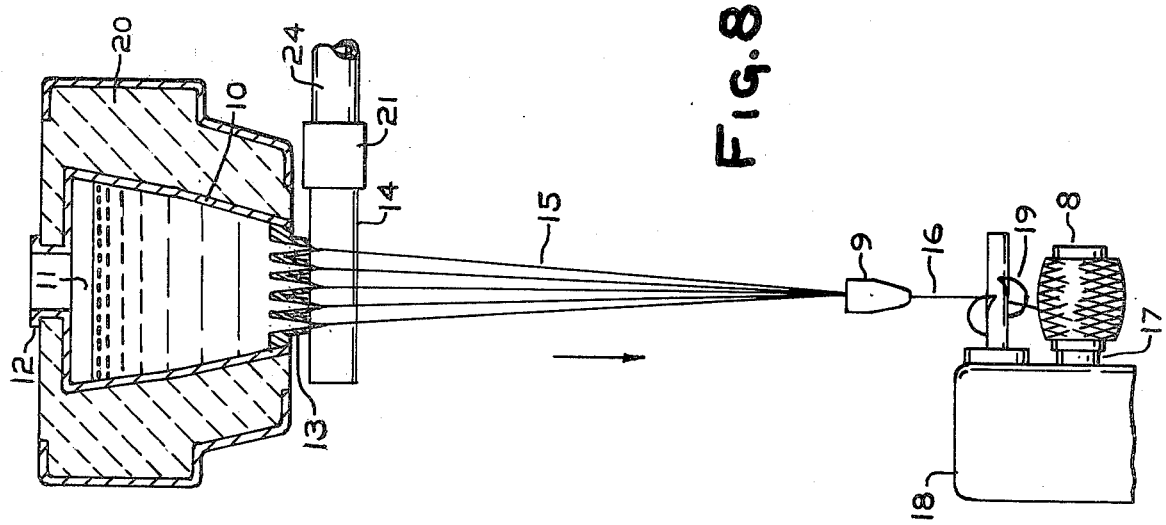
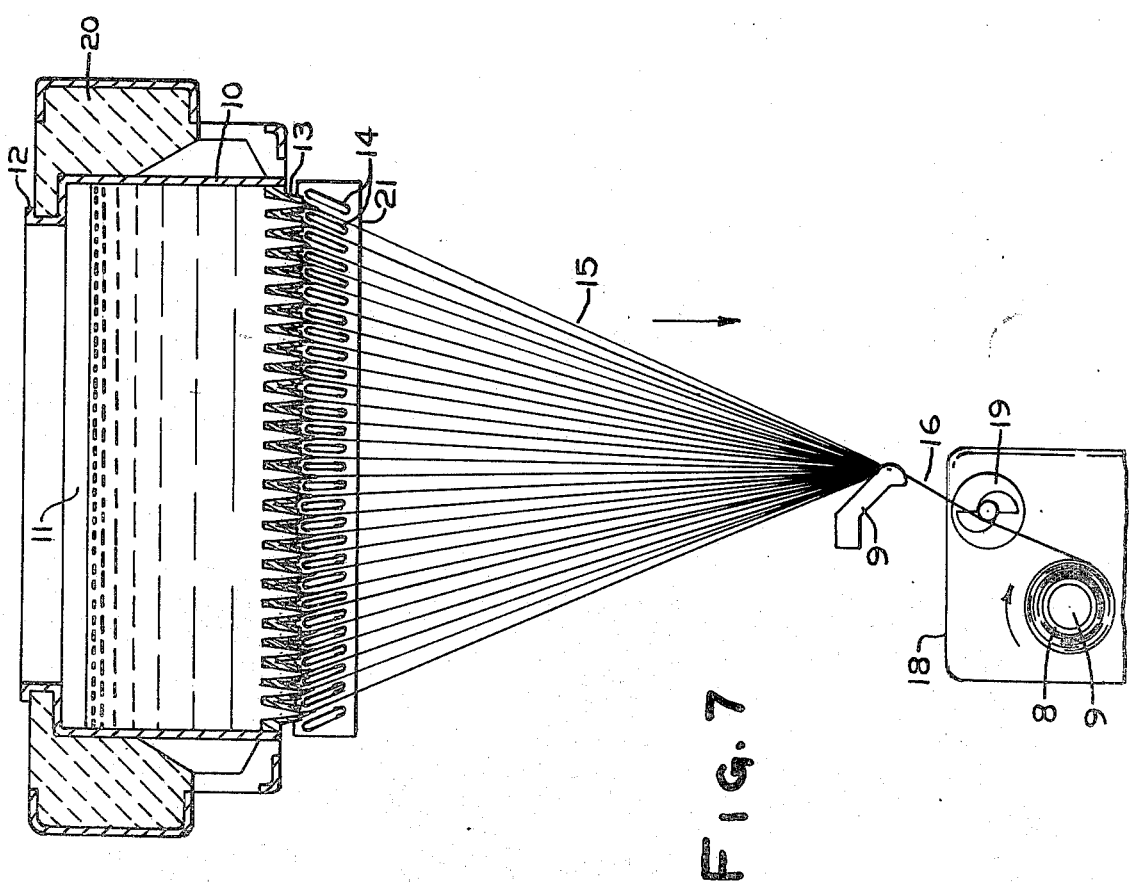

HEAT PIPES FOR FIN COOLERS

BACKGROUND OF THE INVENTION

In the production of glass fibers by a continuous process a number of individual glass filaments are drawn at high speed from an electrically heated noble metal bushing. In a typical fiber glass forming operation, molten glass from a suitable source is fed to a platinum bushing (a small container constructed of platinum or a platinum alloy). The bushing is heated electrically to maintain the supply of glass fed thereto in a molten state. The bottom of the bushing is supplied with a plurality of holes, tips or orifices through which the molten glass issues as molten streams. These streams issuing from the orifices are attenuated into fibers by drawing the streams of glass down from the bushing and winding them on a rapidly rotating forming tube. The rotation of the forming tube provides the pulling force for attenuating the glass into fibers.

In modern fiber glass manufacturing operations, the tips or orifices through which the fibers are attenuated are typically aligned in horizontal rows along the length and the width of the bottom of the fiber glass bushing. In the operation of such a bushing, heat is radiated from the bushing to the cones of glass formed as the molten glass leaves the tips and is formed into fibers. As a result, the cones of glass from which fibers are formed often cannot cool rapidly enough to form continuous fibers of uniform dimension. Viscosity in molten glass cones is low and the cones have a tendency to constrict into droplets instead of flowing as a continuous stream. This is caused by the surface tension of the glass overcoming the viscosity since the glass surface tension changes very little with temperature.

When heated bushings are employed, it has been found necessary for proper fiber formation to extract heat energy from molten cones of glass and the fibers attenuated from the apex of the molten cones of glass. This is especially necessary in larger bushings containing several rows of tips. The cooling of the cones of glass increases the viscosity of the molten glass cones and thereby eliminates constriction and droplet formation. Further, cooling of the glass cones in this manner provides for more uniform cone formation from the front to the back of the bushing in the rows of cones located in larger bushings. Uneven cone formation from a row of bushing tips located from the front to the back of a larger bushing results in uneven tension during the high speed attenuation normally associated with fiber glass formation and frequently results in breakouts. By the application of proper cooling techniques between the rows of cones, this problem is eliminated or substantially reduced.

It is well known in the art to provide means for extracting heat energy from cones of glass from which glass fibers are being drawn. Exemplary of such teachings are the teachings found in U.S. Pat. No. 2,908,036 and the method described in U.S. Pat. No. 3,251,665. In the first of these patents, apparatus is disclosed for cooling cones of molten glass by means of a solid metallic fin positioned between lateral rows of glass cones formed on the bottom of a bushing. The lateral fins in this patents are connected to a common header device through which cooling material such as water is circulated. The flat fins described provide heat transfer between the molten glass cones and the cooling liquid by using the thermal conductivity of the fins which while satisfactory is not the most efficient method of removing heat from the glass. These fins nevertheless have achieved a considerable degree of success in the art in that heat is removed from the cones of glass and dissipated to the common header where it is removed by the circulating cooling media passing therethrough. In U.S. Pat. No. 3,251,665, a hairpin cooler through which a cooling fluid is passed is positioned between the rows of cones in a fiber glass bushing operation to dissipate heat from the areas of the cones in a rapid manner to provide for even cone formation and adequate cooling of the glass fibers as they are emanating from the tip. Since the spacing between the tips is very small and the hairpins are of small diameter, however, difficulties are often encountered by impurities in the cooling fluid clogging the cooling fluid passages in the hairpin coolers.

THE PRESENT INVENTION

While the prior art devices enumerated above are useful in the removal of heat energy from the area of a cone of glass during a fiber glass forming operation in commercial fiber glass bushings, the present invention provides a heat-removal system which is highly efficient and which rapidly removes heat from glass fiber bushing tips. In one embodiment of the instant invention, utilization of a plurality of heat-exchange members in a specific orientation and design provides a thermal gradient in the area of cone formation in a fiber glass bushing to assist in the control of cone formation during attenuation and heat dissipation therefrom in a precise manner.

Thus, in accordance with one embodiment of the instant invention, a heat-exchange system for utilization with a fiber glass bushing is provided which consists of a header having means provided therein for the circulation of a cooling fluid therethrough. Projecting from the header are sealed, platelike fins, in parallel rows, constructed and arranged to be positioned between the rows of fiber glass bushing orifices or tips to thereby provide a flat surface on each side of a fiber glass bushing tip and establish a heat-exchange relationship with any fibers being drawn from said tips. The plates characteristically contain on the internal peripheral surfaces of at least both long axes thereof, i.e., at the top and at the bottom, a wick material. Preferably the internal periphery of the entire plate contains the wick material. A heat-exchange fluid is in constant contact with the wick material. The heat-exchange fluid is vaporizable at a first temperature and condensable at a second temperature. The platelike fin is also provided with a central cavity to provide for circulation of the vapors of the heat-exchange fluid from the wick from one end of the plate member to the other and for condensation of the vapors onto the wick at a point remote from the point of vaporization.

In a further embodiment of the instant invention, a plurality of cooling members preferably tubular in shape and each containing a wick material on the circumferential internal surfaces thereof are mounted on a manifold member through which fluid is circulating usually out of contact with the pipe members. The cooling members are each provided with wick material containing a fluid therein which is vaporizable at one temperature and is condensable at a second temperature. If desired, the metallic members of this embodiment or of the first embodiment may be mounted in the manifold member so that they physically contact the circulating fluid. The vaporizable material on the wick of each vertical row of pipe members in this embodiment may be variable in composition so that the tubular-like members can be arranged in vertical rows below a fiber glass bushing tip in such a manner to provide for a temperature gradient between the tube at the top of a row and each of the tubes located immediately below the top tube.

For a more complete understanding of the instant invention, reference is made to the accompanying drawing in which:

FIG. 1 is a diagrammatic illustration of a glass fiber fin cooler showing the manifold and the platelike heat-exchange fins of the invention in place, FIG. 2 is a side view of the manifold and the cooling fins of the instant invention, FIG. 3 is a front view of the embodiment of the fin cooler of FIG. 1, FIG. 4 is a longitudinal section of the fin of FIG. 2, FIG. 4a is a cross section of the fin of FIG. 2 taken on lines 4a—4a, FIG. 5 is a front view of a modification of the fin cooler of FIG. 1 employing circular pipe as fins, FIG. 6 is a side-elevational view of the fin coolers of FIG. 5, FIG. 7 is a front view of a fiber glass bushing and the fins of FIG. 1 in place, and FIG. 8 is a side view of FIG. 7 partially in section.

Turning first to FIGS. 7 and 8, there is shown therein a fiber glass bushing 10 provided with a central canal 11 which communicates with a flow block 12 for molten glass which is attached to a suitable glass melting furnace forehearth (not shown). The bushing 10 is insulated with refractory material 20 which, in general, surrounds the bushing. The bushing contains at the bottom portion thereof a plurality of fiber glass forming orifices (tips) 13 and emanating from the bushing tips is a fan of glass filaments 15 which pass through a gathering shoe 9 for consolidation into a single strand 16 which is subsequently wound on a winder 17 driven by a motor contained in housing 18. Fibers 16 are laid down on the package 8 utilizing the spindle member 19 located above the winder 17.

Located immediately below the fiber glass bushing tips 13 shown in FIGS. 7 and 8 are a plurality of fin cooler plate members 14 which are affixed to a header member 21. Header 21 is provided with a central canal 22 through which water or other similar cooling media flows during operation of the bushing 10. In the view shown in FIG. 7, the fin members 14 are shown surrounding each of the glass filaments 15 issuing from the fiber glass forming tips 13 located on the bottom of the bushing member 10. As shown more clearly in FIG. 1, the cooling fluid is passed into the canal 22 of manifold 21 at one side of the manifold member 21 via pipe 23 and exits at the opposite end, through the pipe 24. The fin members 14 are typically embedded in the wall of the manifold member 21.

In accordance with the instant invention, the fin member 14 which is inserted in the manifold member 21 as shown in FIGS. 1 to 6 and 7 is specially constructed as shown in FIG. 4. Thus, the fin member generally indicated at 14 is provided with a central chamber 31 which is surrounded by a wick member 30, and the fin member is sealed. The wick material is provided with a suitable heat transfer fluid therein so that it is constantly wetted and the entire fin 14 is encased in metal with the wick material and its associated heat transfer fluid covering the interior surface of the fin member. The construction of the fin is such (see FIG. 4a) that a central space or chamber 31, is provided between the walls of the fin 14 for the circulation of gases and/or fluids during operation. During the cooling of glass fibers 14 drawn from the bushing tips 13, heat is picked up by the faces of the fin members 14 causing vaporization of the heat transfer fluid contained in the wick member 30 of the fin coolers 14. The removal of heat from the area of the glass fibers 15 by the fin cooler member 14 and the walls thereof causes the fluid contained in the wick 30 to vaporize and circulate in the manner shown by the arrows in FIG. 4. Thus, the heat transfer fluid in the wick 30 vaporizes and flows towards the end of the fin 14 which is embedded in the manifold member as shown in FIG. 4. These vapors recondense on the wick near the jointure of the fin bar 14 within the manifold member 21. Considerable heat is removed from the back wall of the fin cooler 14 by the manifold member 21 and the water circulating in the central canal 22 therein. Thus, heat is rapidly removed from the surface of the fin member, and the removal of the heat causes a recondensation of the heat transfer fluid onto the wick surfaces contained in the fin cooler 14. The condensed liquid flows toward the other end of the fin cooler by capillary action thus continuously providing further liquid for vaporization and consequent heat removal from the surrounding fibers 15.

In another modification of the fin coolers shown in FIGS. 6 and 7, a plurality of cylindrical heat pipes of smaller dimension are stacked in vertical rows underneath the bushing tips 13 and between the rows of bushing tips 13. This modification is shown in more detail in FIG. 5 which illustrates a manifold member 51 with a plurality of fin cooler pipes 52 stacked in vertical rows from the top to the bottom of the manifold 51. In general operation, the fin cooler pipes 52 are mounted in the manifold 51 in the same manner that the plate-type fin bars 14 are mounted in manifold 21. In this embodiment of the invention, the cylindrically shaped heat transfer members 52 contain a wick similar in construction to the wick shown in FIG. 4 for the plate-type members and the pipes 52 are sealed at both ends with the pipes 52 operating in the same manner as the plate member described hereinabove with respect to FIG. 4. The essential difference in this embodiment over the embodiment shown in FIG. 4 is that different materials may be utilized as the heat transfer fluid in each of the vertically stacked pipe members 52. Thus, the top pipe member 52A and the pipes located immediately below it, i.e., 52B, 52C and 52D can contain in the wicks positioned therein heat transfer materials having different heats of vaporization to provide a temperature gradient between the rows of heat transfer pipes 52 in a vertical direction. Thus, glass fibers passing between the rows of heat pipes 52 can be controllably reduced in temperature by the surfaces of the heat pipes 52, each of these operating with different heat transfer media therein to controllably remove heat from fibers 15 during the vertical movement of the glass fibers 15 as they pass by each pipe 52. FIG. 6 shows the manifold 51 with the pipes 52 embedded therein, the central cooling channel 53 and the outlet line 54 for the cooling fluid circulated in cooling channel 53.

In the construction of the equipment described in the aforementioned drawings, recourse to conventional glass fiber forming bushing materials is had. Thus, the bushing member 10 is usually constructed of platinum or a suitable platinum alloy such as a platinum-rodium alloy. The bushing tips are also constructed in the conventional manner, and while bushing tips are utilized in the illustrations contained herein, it is to be understood that orifices can also be employed.

The fin cooler plate members 14 are typically, on their exterior surfaces, composed of suitable metal having a high-heat transfer coefficient. Typical of the materials utilized in providing adequate heat transfer are materials such as copper and silver. In addition, due to the high efficiency of the wick material in transferring heat, the plates and pipes may be constructed of stainless steel or aluminum. These fin materials may be coated with other metals to provide resistance to contamination by binders in the environment surrounding the bushing and thus typically may be coated with a thin layer of nickel or chromium or some other metal of this character to provide this type of protection. It is not essential that the fin bars be coated and recourse to plain copper bars is acceptable. The header material is, in general, a copper member containing a centrally drilled hole through which heat transfer fluid flows. In the preferred embodiment of the instant invention, the heat transfer fluid utilized in the header is water.

Various wick materials may be used in the fin cooler plates and tubes shown herein. Thus, materials suitable for wicks include cloth, glass fibers, wire screening, ceramics and the like. The vaporizable liquids used can include such materials as water, vaporizable solvent materials such as trichloroethylene, perchloroethylene, chloroform, methyl chloroform, carbon tetrachloride, methanol, glycerine, mercury, and the like.

Utilizing the heat transfer plates and tubes of the instant invention in lieu of the conventionally utilized solid metal materials, heat transfer rates considerably in excess of those currently capable of being achieved are readily achieved. Thus, utilization of the internal wick on the cooling surfaces of the metal plates and cylindrical tubes utilized for cooling in the fin cooler constructions in the instant invention provide heat transfer rates of such a magnitude that operation of larger bushings with many more rows of tips can be readily achieved since the problems of removing heat where the depth of fiber glass bushing rows has limited this in the past is no longer a serious problem. While the invention has been described with reference to certain specific examples and illustrated embodiments, it is not intended that it be limited thereby except insofar as appears in the accompanying claims.

I claim:

1. A fiber glass forming unit comprising in combination a container for the reception of molten glass, a plurality of orifices on the bottom of said container arranged in parallel rows, vertically stacked rows of pipes positioned between each of the rows of orifices, each of the individual pipes constituting a vertical stacked row having a wick material affixed to the interior surface thereof and defining a central cavity therein, a vaporizable liquid being placed on said wick material in each of said pipes, each of the vertical rows of pipes being mounted in a common header constructed and arranged to provide for fluid coolant flow therethrough and for heat transfer from the point of mounting by indirect heat exchange to the surface of each of said pipes in each of said rows.

2. The apparatus of claim 1 wherein the vaporizable liquid in each of said pipes in a vertical stack is vaporizable at a different temperature than the one above or below it.

3. A method of cooling glass fibers being drawn from a fiber glass forming unit by attenuation from a plurality of orifices located on the bottom of said fiber glass forming unit in rows comprising: placing below and out of contact with the fiber glass forming unit and between the rows of orifices through which the filaments are being drawn a vertical stack of small pipes for each row, each of said stacks of pipes being mounted in a common header and cooled by indirect heat exchange therewith by a fluid coolant flowing therethrough, providing in each of said pipes a wick material containing vaporizable liquid, the vaporizable liquid in each of the pipes forming a single stacked row of pipes being vaporizable at a different temperature, continuing to draw the glass fibers through the bushing and past the vertical stacked rows of pipes and establishing a temperature gradient along the vertical stacked rows of pipes from the top pipe to the bottom pipe by vaporizing the liquid contained in each of the pipes constituting a single stacked row at different temperatures.

* * * * *